United States Patent Office 3,554,996
Patented Jan. 12, 1971

3,554,996
METHOD OF MAKING POLYOLEFIN METAL-OR-
GANIC CHELATE COMPOSITIONS AND THE
RESULTING PRODUCTS
Henry Nelson Beck, Walnut Creek, Calif., assignor to
The Dow Chemical Company, Midland, Mich., a corporation of Delaware
No Drawing. Filed Apr. 24, 1967, Ser. No. 632,930
Int. Cl. C08f 27/04
U.S. Cl. 260—93.7        12 Claims

ABSTRACT OF THE DISCLOSURE

This invention discloses a method of crystallizing hydrocarbon polymers as well as the resulting product. A hydrocarbon polymer is melted with a small amount of a metal-organic chelate so as to induce the crystallization of the melt at a higher temperature than would normally occur. The use of this method and/or composition in the fabrication of useful shapes of the polymeric composition results in higher production rates due to the more rapid crystallization and/or hardening of the desired shape and an increase in the tensile strength of the finished product.

---

This invention relates to thermoplastic polymers, particularly hydrocarbon polymers such as α-olefin polymers, which on cooling from a molten condition are capable of crystallizing with the formation of crystallites and spherulites from the polymer molecules in the mass. More particularly, it pertains to modifying the growth habits of such crystallized structures by affecting the occurrence of nuclei thereof by the presence in the α-olefin polymer composition of added metal-organic crystallization modifiers or nucleating agents.

It is well known that many thermoplastic high polymers are capable of crystallization and that many of the physical properties of such polymer products are greatly affected by the degree of crystallinity and the nature of the resulting crystalline structure. Thus, for example, crystallizable polymers such as solid, high molecular weight polypropylene may be fabricated to have little or no crystallinity or to have a high degree of crystallinity; highly crystallized products may be composed of relatively few but large crystallites or may be composed of a large number of small crystallites. The same is true for high molecular weight polyethylene except that a much smaller range of crystallinity is possible as a result of process variables. Generally, products in which there are many, small, uniform spherulites have greater impact strength, creep resistance, clarity, and tensile strength than those in which there are fewer, larger, and less uniform spherulites.

In the past, attempts have been made to influence the nature and extent of crystallization of crystallizable polymers by thermal, mechanical, and/or procedural means in order to obtain the desired products. While often successful, these means are usually tedious and time-consuming, involving slow and critically conducted time-temperature cooling and/or heating schedules and multiple step handling. Moreover, control of crystallization of crystallizable polymers by thermal and/or mechanical means has been practically limited to articles having thin and uniform sections such as fibers, filaments, foils and thin sheets.

It is known to add nucleating agents, such as high melting point polymers, inorganic solids, and lead phosphate to polyethylene, polypropylene and Nylon 6 (R. N. Howard, "Chemistry and Industry," Aug. 15, 1964, pp. 1442–1455).

It is also known to add various acids and acid salts to polyolefins to increase the desirable physical properties of the resultant product, e.g. U.S. Pat. 3,207,735 uses cyclic monocarboxylic acids; 3,207,736 uses aliphatic and aromatic dicarboxylic acids; 3,207,737 uses aluminum salts of carboxylic and polycarboxylic acids; 3,207,738 uses arylalkanoic acids; 3,207,739 uses sodium salts of carboxylic and polycarboxylic acids; 3,268,499 uses lithium benzoate.

An object of this invention is to provide means for modifying the growth habits of crystalline structures formed in crystallizing crystallizable polymers, especially α-olefin polymers. A further object is to provide such means for affecting the kind of crystallites initiated in crystallizing crystallizable polymers, especially α-olefin polymers and for affecting the frequency of nucleation of polymer crystallites and spherulites and for increasing the rate at which crystallization occurs. A more particular object is to provide such means for affecting, influencing, and modifying the habits of crystallization of crystallizable polymers, especially α-olefin polymers, by the presence therein of added metal-organic crystallization modifiers. A further object is to provide such means whereby the habit of crystallization of crystallizable polymers, especially α-olefin polymers, is affected, influenced, modified and controlled primarily by the kind and amount of added organic crystallization modifiers rather than by the rate of cooling or other thermal, mechanical, or procedural factors. A related object is to provide such means which are applicable to fabrication of plastic articles having other than thin, uniform sections. Other objects and advantages of this invention will be apparent in the following description.

In accordance with this invention, the habits of crystallization of crystallizable, thermoplastic, solid polymers, especially hydrocarbon polymers and more particularly α-olefin polymers such as polyethylene and polypropylene, are affected, influenced, modified, and controlled by the presence in the polymer composition of certain added metal organic chelate crystallization modifiers. The added metal organic chelate modifiers used in accordance with this invention are one which are solid and chemically stable under the conditions of polymer crystallization and are characterized by being wet by the polymer, or adsorbing the polymer on its surface at and below the polymer melting point, or by being soluble to at least an appreciable extent in the polymer above the crystalline melting point of the polymer and being used to an extent exceeding the solubility of the additive in the polymer at the crystalline melting point of the polymer.

For the purposes of my invention, a metal chelate is defined as a complex or coordination compound in which the metal is combined with two or more donor groups in an organic compound so that one or more closed heterocyclic rings are formed ("Chemistry of the Metal Chelate Compounds" by Martell and Calvin, Prentice Hall, Inc., New York, 1952).

Many diverse kinds of metal organic chelate materials have properties enabling them to be used in accordance with this invention. Many of the effective additives are ones in whose molecular structure there is at least one proton-donor group and at least one proton-acceptor group which can provide intermolecular hydrogen bonding, although it appears that the function of the metal organic chelate crystallization modifiers is primarily physical and steric as contrasted with a chemical reaction. Among suitable crystallization modifiers for the purposes of this invention are the following, given for purpose of illustration and not of limitation:

Aluminum, iron, strontium, antimony magnesium, barium, manganese, titanium, cadmium, and calcium chelates of the compounds shown by the following formula:

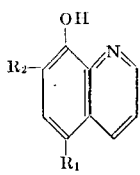

where $R_1$ and $R_2$ are hydrogen or halogens having an atomic number of 9–53 inclusive.

Representative compounds, within the scope of the above formula are 8-hydroxyquinoline;
5,7-diiodo-8-hydroxyquinoline;
5-chloro-7-iodo-8-hydroxyquinoline;
5,7-dichloro-8-hydroxyquinoline;
5-iodo-8-hydroxyquinoline;
5,7-dibromo-8-hydroxyquinoline;
5,7-difluoro-8-hydroxyquinoline;
5-fluoro-7-chloro-8-hydroxyquinoline;
5-chloro-7-bromo-8-hydroxyquinoline and
5-bromo-7-fluoro-8-hydroxyquinoline.
Cadmium, copper, iron, aluminum and zinc chelates of α-quinaldic acid
Iron chelate of α-nitroso-β-naphthol
Copper, cobalt, manganese, and cadmium chelates of salicylaldoxime
Copper chelate of 2-salicylideneaminophenol
Nickel and copper chelates of sym-bis-salicylideneaminoethane
Copper chelate of N,N'-bis-salicylidene-o-phenylenediamine
Nickel chelate of dimethylglyoxime
Cobalt, cadmium, iron, copper, manganese and nickel chelates of the compounds shown by the formula

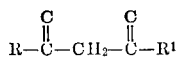

wherein R, $R^1$ are phenyl groups or alkyl groups of 1–4 carbon atoms.

Representative compounds within the scope of the above formula are 5,7-undecanedione;
4,6-nonanedione;
3,5-heptanedione;
2,4-pentanedione;
2,4-hexanedione;
2,4-heptanedione;
2,4-octanedione;
1-phenyl-1,3-butanedione;
1-phenyl-1,3-pentanedione; and
1,3-diphenyl-1,3-propanedione.

Copper, cadmium and zinc chelates of p-phenylenediamine
Cadmium, nickel, manganese, zinc cobalt, iron, copper and aluminium chelates of anthranilic acid
Copper and molybdenum chelates of benzoin antioxime
Copper, nickel, cobalt, iron chelates of dithiooxamide
Antimony, bismuth, lead, zirconium, zinc cadmium, aluminum, cobalt, titanium, molybdenum, iron, copper, magnesium, manganese, nickel, strontium, tin, calcium chelates of 8-hydroxyquinoline-formaldehyde copolymer Zirconium chelate of benzenearsonic acid
Nickel chelate of α-furilidioxime
Ferrocene
Poly[di-μ-diphenyl-phosphinato-acetylacetonato-chromium (III)]
Tin chelate of tetraphenylarsonium chloride The above metal organic chelates are readily prepared from known techniques. General preparatory references are:

(1) Willard, H. H. and Diehl, H.: "Advanced Quantitative Analysis," Van Nostrand Co., New York (1943), pp. 64–89.
(2) Flagg, J. F.: "Organic Reagents," Interscience, New York, 1948.
(3) Mellan, I.: "Organic Reagents in Inorganic Analysis," Blakiston, 1941.
(4) May, I. and Schubert, L.: "Treatise on Analytical Chemistry," Interscience, New York, 1961, Part I, vol. 2, Chapter 21, pp. 833–916.

Specific preparatory references are:

(1) Degeise et al.: "Journal of Applied Polymer Science," vol. 9, pp. 411–419 (1965), (Copolymers of 8-OH-quinolineformaldehyde).
(2) Fernelius, W. C.: "Inorganic Syntheses," McGraw-Hill, New York (1946), vol. II, pp. 25–26; Berg, E. W. et al.: "Journal Physical Chemistry," vol. 64, 487 (1960), (Chelates of 1,3-diketones).
(3) Block, B. P. et al.: J.A.C.S., vol. 84: 1749 (1962), (poly [di-μ-diphenyl-phosphinatoacetylacetonato chromium III]).
(4) Beilstein: "Handbuch der Organischen Chemie," vol. 13, p. 369, (2-salicylideneaminophenol).
(5) Beilstein: "Handbuch der Organischen Chemie," vol. 8, p. 48; Dubsky, J. V. et al.: "Coll. Czech. Chem. Communications," vol. 3, pp. 548–9 (1931), [C. A. 26:1538 (1932)], (sym-bis-salicylideneaminoethane).
(6) Beilstein: "Handbuch der Organischen Chemie," vol. 13, 1st. Suppl., p. 7, (N,N'-bis-salicylidene-o-phenylenediamine).

The foregoing groups of metal chelates are obviously diverse as to the molecular configuration providing the chelated structure. Their common but unexpected property is their effect on the nucleation of crystallization of polyolefins.

The ability of a metal chelate to act as nucleating agent in polyolefins may be measured and evaluated by the differential thermal analysis (hereinafter called D.T.A.) technique. In accordance with this invention, metal chelates of the kind described are effective nucleation agents for polyolefins when they provide a peak temperature value (i.e. freezing point) of at least 115° C. when tested in accordance with the D.T.A. procedure described below. The D.T.A. technique is described and shown in the "Journal of Applied Polymer Science," vol. 9, pp. 2131–2142 (1965) which is incorporated herewith by reference. Briefly, the apparatus described therein provides a method whereby thermograms of the melting and solidifying of the polymer are obtained. The peak temperature ($T_p$) occurs at the intercept of the tangents to the sides of the exothermic curve of the thermogram and is a measure of the temperature when the bulk of the polymer has crystallized. In the test procedure to follow, it was found that the addition of the metal organic chelates set forth above increased the peak temperature of the polymer sample to at least 115° C. Hence these nucleating agents will reduce the supercooling of the polymers into which they are put, and the derived peak temperature is a measure of the efficacy of the metal chelate involved. Polymer compositions having such high peak temperatures are of great value in injection molding operations since more parts per hour can be produced due to the more rapid crystallization and hardening produced in the injection molded parts.

TEST PROCEDURE

A pure sample of commercial isotactic polypropylene of 200 grams (made by the Ziegler-Natta process) and having the following characteristics:

Density at 25° C. _____ 0.905.
Melt index _____ 1.23 g./10 min. at 190° C. under 2160 g. load.
Freezing point ($T_p$) ___ 106° C.
Tensile strength (Method ASTM D-1708, Speed C) _____ 2800 p.s.i.
Molecular weight range_ 248–249×10³.

was prewarmed with 0.50 g. (.25 percent by weight) of a metal chelate nucleating agent for 5 minutes at 150° C., then milled for 5 minutes at 150° C. in a Meili laboratory kneader at a speed of 60–120 r.p.m.

The sample was then placed in the foregoing D.T.A. apparatus, melted and analyzed using the same cooling rate for each test. By using this test procedure, I have discovered that the foregoing metal-organic chelates are active in reducing the supercooling of thermoplastic polymers, increasing the freezing point and at the same time increasing the tensile strength to a considerable degree.

The polymers which are employed in the practice of this invention are thermoplastic polymers, particularly hydrocarbon polymers and especially α-olefin polymers which crystallize on cooling from a molten condition with formation in the mass of polymer crystallites and spherulites. Such materials are well known in the art and include polyethylene and stereoregular polypropylene, poly(butene-1), poly(3-methyl-1-butene), polystyrene, and crystallizable diene polymers and crystallizable copolymers including stereoblock copolymers.

The metal organic chelate crystallization modifiers used in accordance with this invention are employed in a small proportionate amount based on the crystallizable polymer, usually not more than about 5 percent by weight, although larger amounts can sometimes be tolerated where the material is inexpensive and has minimum adverse effect on other properties of the plastic product. Beneficial effects on polymer crystallization in accordance with this invention are usually obtained at lower levels of added modifier from about 0.005 percent, preferably in the order of from about 0.05 to about 0.5 percent by weight based on the polymer.

The metal organic chelate crystallization modifiers can be introduced into the polymer composition in various ways employing conventional procedures and apparatus. Thus, the modifier can in some instances be incorporated into the polymerization reaction mixture immediately following polymerization. Another suitable method is to blend the modifier with the heat-plastified polymer with mechanical working as in a Banbury mixer, any of various kneaders, or any of various mixing extruders, on mill rolls, or the like. This step can involve preparation of a concentrate of the modifier in a portion of the crystallizable polymer and subsequent dilution with further amounts of polymer. In the preliminary stage of preparing the composition of crystallizable polymer and crystallization modifier for use in accordance with this invention, it is only necessary that the materials be intimately and uniformly mixed together.

In practicing the method of this invention to obtain the benefits thereof as to modifying the habits of crystallization of crystallizable polymers, the composition of polymer and added organic crystallization modifiers as defined is heated to a temperature above the crystalline melting point of the polymer and then cooled to a temperature below such crystalline melting point at which crystallization can take place. These temperatures will, of course, be selected according to the particular crystallizable polymer and in accordance with the skill of the art. The heating and cooling can be accomplished with conventional apparatus and procedures, and already known techniques of handling can be employed. Usually the heated polymer composition in heat-plasticized condition is fabricated into a useful or potentially useful shape such as fibers, filaments, films, sheets, rod, tubes or other extruded sections or molded articles and subsequently cooled to "set up" the shape and induce crystallization. In a particular embodiment, a heat-plasticized plastic composition is pressed by compression or injection into a mold space and cooled to "set up" the plastic mass, after which the mold is opened and the molded article is ejected.

It has been found that the foregoing metal chelates are not only effective nucleating agents for thermoplastic polymers but also that they do not interact with, interfere with, or antagonize the usual antioxidants or light stabilizers which are normally added to commercial plastics. Furthermore, the foregoing metal chelates are non-toxic in the amounts used by me and are practically non-extractable from the polymer mixture.

The following examples illustrate the invention but are not to be construed as limiting its scope.

EXAMPLES 1–84

A number of metal chelates were tested in samples of commercial polypropylene containing 0.1 percent of 2,6-di-t-butyl-4-methyl phenol (BHT) as an oxidation inhibitor. In each of the examples to follow 0.50 g. (0.25 percent) of the listed metal chelate was added to 200 grams of the commercial polypropylene, prewarmed for five minutes at 150° C., milled at 150° C. at a speed of 60–120 r.p.m. in a Meili (type CK-1) laboratory kneader and melted at 200° C. in a D.T.A. apparatus as set forth above. The values for the peak temperatures ($T_p$, ° C.) set forth in the following Table I were determined and recorded. The tensile strength was determined by ASTM D-1708, Speed C and recorded as set forth.

In Examples 2–5 and 83 the ranges of $T_p$, ° C., and tensile yield stress values obtained in replicate tests are given. The values given in the other examples were obtained in single tests.

TABLE I
[CHELATES OF 8-HYDROXYQUINOLINES (OXINES)]

| Example | Compound | $T_p$, ° C. | Tensile yield stress, p.s.i. |
|---|---|---|---|
| 1 | Control (no added chelate) | 106 | 2,800 |
| 2 | Fe(oxine)₃ | 125–128 | 4,700–4,900 |
| 3 | Sr(oxine)₂ | 123–124 | 4,600–4,900 |
| 4 | Ca(oxine)₂ | 119–123 | 4,400–4,700 |
| 5 | Al(oxine)₃ | 122–131 | 4,700–4,900 |
| 6 | Mg(oxine)₂ | 119 | 4,800 |
| 7 | Ba(oxine)₂ | 118 | 4,600 |
| 8 | Mn(oxine)₂ | 118 | 4,500 |
| 9 | Ti(oxine)₄ | 117 | 4,800 |
| 10 | Sb(oxine)₃ | 117 | 4,600 |
| 11 | Cd(oxine)₂ | 116 | 4,600 |
| 12 | Fe(5-I-oxine)₃ | 122 | 4,500 |
| 13 | Al(5,7-I₂-oxine)₃ | 123 | 4,500 |
| 14 | Fe(5,7-I₂-oxine)₃ | 120 | 4,800 |
| 15 | Fe(5-Cl-7-I-oxine)₃ | 125 | 4,500 |
| 16 | Al(5-Cl-7-I-oxine)₃ | 123 | 4,800 |

[CHELATES OF α-QUINALDIC ACID]

| Example | Compound | $T_p$, ° C. | Tensile yield stress, p.s.i. |
|---|---|---|---|
| 17 | Cd(quin)₂* | 126 | 4,300 |
| 18 | Cu(quin)₂ | 124 | 4,700 |
| 19 | Fe(quin)₃ | 123 | 4,700 |
| 20 | Cd(quin)₂* | 121 | 4,600 |
| 21 | Al(quin)₃ | 119 | 4,800 |
| 22 | Zn(quin)₂ | 119 | 4,600 |
| 23 | Fe(quin)₂ | 119 | 4,600 |

[CHELATE OF α-NITROSO β-NAPHTHOL]

| Example | Compound | $T_p$, ° C. | Tensile yield stress, p.s.i. |
|---|---|---|---|
| 24 | Fe(αNβN)₃ | 115 | 4,300 |

[CHELATES OF SALICYLALDOXIME]

| Example | Compound | $T_p$, ° C. | Tensile yield stress, p.s.i. |
|---|---|---|---|
| 25 | Mn(Sal)₂ | 120 | 4,400 |
| 26 | Cd(Sal)₂ | 118 | 4,900 |
| 27 | Co(Sal)₂ | 120 | 4,500 |
| 28 | Cu(Sal)₂ | 119 | 4,800 |

3,554,996

TABLE I—Continued

[CHELATE OF 2-SALICYLIDENEAMINOPHENOL]

| Example | Compound | $T_p$, °C. | Tensile yield stress, p.s.i. |
|---|---|---|---|
| 29 | Cu(SAP)₂ | 124 | 4,600 |

[CHELATES OF SYM BIS SALICYLIDENEAMINOETHANE]

| 30 | Ni(SAE)₂ | 122 | 4,600 |
| 31 | Cu(SAE)₂ | 115 | 4,700 |

[CHELATE OF N,N'BIS SALICYLIDENE-o-PHENYLENEDIAMINE]

| 32 | Cu(SPD)₂ | 122 | 4,500 |

[CHELATE OF DIMETHYLGLYOXIME]

| 33 | Ni(DMG)₂ | 119 | 4,400 |

[CHELATES OF 1,3-DIKETONES R—C(=O)—CH₂—C(=O)—R']

| Example | Metal | R | R' | $T_p$, °C. | Tensile yield stress, p.s.i. |
|---|---|---|---|---|---|
| 34 | Fe⁺³ | Ph | Ph | 117 | 4,700 |
| 35 | Cu⁺² | Me | Me | 116 | 4,700 |
| 36 | Cu⁺² | Ph | Ph | 116 | 4,800 |
| 37 | Co⁺² | Ph | Me | 121 | 4,500 |
| 38 | Cd⁺² | Ph | Ph | 120 | 4,900 |
| 39 | Fe⁺³ | Ph | Ph | 119 | 4,500 |
| 40 | Cu⁺² | Ph | Me | 119 | 4,900 |
| 41 | Mn⁺² | Ph | Ph | 118 | 4,800 |
| 42 | Ni⁺² | Ph | Me | 118 | 4,900 |

[CHELATES OF p-PHENYLENEDIAMINE]

| Example | Metal | $T_p$, °C. | Tensile yield stress, p.s.i. |
|---|---|---|---|
| 43 | Cu⁺² | 120 | 4,600 |
| 44 | Cd⁺² | 120 | 4,600 |
| 45 | Zn⁺² | 120 | 4,400 |

[CHELATES OF ANTHRANILIC ACID]

| 46 | Cd⁺² | 127 | 4,800 |
| 47 | Ni⁺² | 127 | 4,800 |
| 48 | Mn⁺² | 125 | 4,800 |
| 49 | Zn⁺² | 125 | 4,800 |
| 50 | Co⁺² | 125 | 4,700 |
| 51 | Fe⁺² | 124 | 4,700 |
| 52 | Cu⁺² | 124 | 4,700 |
| 53 | Fe⁺³ | 122 | 4,600 |
| 54 | Al⁺³ | 117 | 4,800 |

[CHELATES OF BENZOIN ANTI-OXIME]

| 55 | Cu⁺² | 124 | 5,100 |
| 56 | Mo⁺⁶ | 120 | 4,700 |

[CHELATES OF DITHIOOXAMIDE]

| 57 | Cu⁺² | 121 | 4,700 |
| 58 | Ni⁺² | 121 | 4,600 |
| 59 | Co⁺² | 121 | 4,600 |
| 60 | Fe⁺² | 121 | 4,500 |
| 61 | Fe⁺³ | 118 | 4,800 |

[CHELATES OF 8-OH-QUINOLINE-FORMALDEHYDE COPOLYMER]

| 62 | Sn⁺² | 126 | 4,700 |
| 63 | Bi⁺³ | 123 | 4,800 |
| 64 | Pb⁺² | 123 | 4,700 |
| 65 | Zr⁺⁴ | 122 | 4,700 |
| 66 | Zn⁺² | 121 | 4,800 |
| 67 | Cd⁺² | 121 | 4,700 |
| 68 | Al⁺³ | 121 | 4,600 |
| 69 | Co⁺² | 120 | 4,700 |
| 70 | Ti⁺⁴ | 120 | 4,700 |
| 71 | Mo⁺⁶ | 120 | 4,700 |
| 72 | Fe⁺² | 120 | 4,800 |
| 73 | Cu⁺² | 120 | 4,800 |
| 74 | Mg⁺² | 120 | 4,600 |
| 75 | Mn⁺² | 120 | 4,550 |
| 76 | Ni⁺² | 120 | 4,500 |
| 77 | Sr⁺² | 120 | 4,100 |
| 78 | Sb⁺³ | 119 | 4,700 |
| 79 | Ca⁺² | 119 | 4,600 |

TABLE I—Continued

MISCELLANEOUS METAL-ORGANIC CHELATES

| Example | Compound | $T_p$, °C. | Tensile yield stress, p.s.i. |
|---|---|---|---|
| 80 | Benzenearsonic acid, Zr⁺⁴ derivative | 121.5 | 4,800 |
| 81 | μ-Furildioxime, Ni⁺² chelate | 120 | 4,700 |
| 82 | Ferrocene | 115 | 4,600 |
| 83 | Poly [di-μ-diphenylphosphinato-acetylacetonato chromium III] | 119-120 | 4,600-4,700 |
| 84 | Sn⁺⁴ derivative of tetraphenyl-arsonium chloride | 117 | 4,700 |

*Compounds of Examples 17 and 20 are isomeric.

In the foregoing table the peak temperature is reproducible to within two degrees (±1° C.) and the tensile yield stress is accurate to within ±200 p.s.i. at a 95 percent confidence level.

It can thus be seen from the foregoing table that the addition of the metal chelate substantially increases the peak temperature of the polymer over that of the unmodified control (Example 1) and at the same time gives an increase in the tensile yield.

I claim:
1. A method for increasing the crystallization rate of a polyolefin which comprises
   (a) melting together said polyolefin and .05–5.0 percent by weight of a metal chelate compound selected from the group consisting of
      (1) compounds of the formula

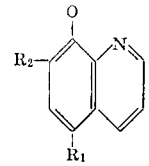

where R₁ and R₂ are hydrogen or halogens having an atomic number of 9–53 inclusive, and (2) anthranilic acid wherein the metal is selected from Groups I–B, II, III–A, IV–B, V–B, VII–B and VIII of the Periodic Chart of the Elements.
   (b) solidifying said melted polymer containing said metal chelate.

2. The method as set forth in claim 1 in which the nickel chelate of anthranilic acid is used.

3. The method as set forth in claim 1 in which the cadmium chelate of anthranilic acid is used.

4. The method as set forth in claim 1 in which the aluminum chelate of 8-hydroxy-quinoline is used.

5. The method as set forth in claim 1 in which the magnesium chelate of 8-hydroxy-quinoline is used.

6. The method as set forth in claim 1 in which the iron chelate of 8-hydroxy-quinoline is used.

7. The method as set forth in claim 1 in which the chelate is an iron chelate of 5,7-diiodo-8-hydroxy-quinoline.

8. The method as set forth in claim 1 in which the chelate is an iron chelate of 5-iodo-8-hydroxy-quinoline.

9. The method as set forth in claim 1 in which the chelate is an iron chelate of 5-chloro-7-iodo-8-hydroxy-quinoline.

10. The method as set forth in claim 1 in which the chelate is an aluminum chelate of 5,7-diiodo-8-hydroxy-quinoline.

11. The method as set forth in claim 1 in which the chelate is an aluminum chelate of 5-chloro-7-iodo-8-hydroxy-quinoline.

12. The method as set forth in claim 1 in which the polyolefin is polypropylene.

References Cited

UNITED STATES PATENTS

| | | | |
|---|---|---|---|
| 3,148,936 | 9/1964 | Turbak | 8—42 |
| 3,248,378 | 4/1966 | Behrenbruch et al. | 260—93.7 |
| 3,258,456 | 6/1966 | Nelson | 260—93.7 |
| 3,322,739 | 5/1967 | Hagemeyer | 260—88.2 |
| 3,458,462 | 7/1969 | Hostetler | 260—23 |

OTHER REFERENCES

Bailor: "Chemistry of the Coordination Compounds," Rheinhold Publishing Corp., New York, N.Y., (1956), pp. 680–681.

JOSEPH L. SCHOFER, Primary Examiner

R. A. GAITHER, Assistant Examiner

U.S. Cl. X.R.

260—88.2, 93.5, 94.2, 94.9, 875

PO-1050
(5/69)

UNITED STATES PATENT OFFICE
CERTIFICATE OF CORRECTION

Patent No. 3,554,996           Dated  12 January 1971

Inventor(s)  Henry Nelson Beck

It is certified that error appears in the above-identified patent and that said Letters Patent are hereby corrected as shown below:

In column 8, Claim 1, line 30, change "chelate compound" to -- chelate of a compound --; in the formula between lines 35 and 45 change "O" to -- OH --.

Signed and sealed this 25th day of May 1971.

(SEAL)
Attest:

EDWARD M. FLETCHER, JR.          WILLIAM E. SCHUYLER, JR.
Attesting Officer                Commissioner of Patents